(12) United States Patent
Bowen

(10) Patent No.: US 9,335,986 B1
(45) Date of Patent: May 10, 2016

(54) HOT PATCHING TO UPDATE PROGRAM CODE AND/OR VARIABLES USING A SEPARATE PROCESSOR

(71) Applicant: Amazon Technologies, Inc., Reno, NV (US)

(72) Inventor: Peter Zachary Bowen, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/103,596

(22) Filed: Dec. 11, 2013

(51) Int. Cl.
*G06F 9/44* (2006.01)
*G06F 9/455* (2006.01)
*G06F 9/445* (2006.01)

(52) U.S. Cl.
CPC ........................................ *G06F 8/67* (2013.01)

(58) Field of Classification Search
None
See application file for complete search history.

(56) References Cited

U.S. PATENT DOCUMENTS

| | | | |
|---|---|---|---|
| 8,321,558 B1* | 11/2012 | Sirota et al. | 718/1 |
| 8,595,723 B2* | 11/2013 | Garrett et al. | 718/1 |
| 2007/0067432 A1* | 3/2007 | Tarui | G06F 13/4027 709/223 |
| 2010/0083015 A1* | 4/2010 | Yokota | G06F 1/3209 713/310 |
| 2010/0153615 A1* | 6/2010 | Baba | G06F 13/4022 710/316 |
| 2010/0269106 A1* | 10/2010 | Arnold | 717/168 |
| 2011/0277027 A1* | 11/2011 | Hayton et al. | 726/8 |
| 2012/0254865 A1* | 10/2012 | Saeki | G06F 9/45533 718/1 |
| 2014/0149985 A1* | 5/2014 | Takeuchi | G06F 9/45558 718/1 |
| 2015/0106660 A1* | 4/2015 | Chumbalkar | G06F 11/0727 714/42 |

OTHER PUBLICATIONS

"System-level Virtualization for HPC: Recent work on Loadable Hypervisor Modules." Irisa. Oak Ridge National Laboratory, Dec. 15, 2010. Web. Feb. 21, 2015. <http://www.irisa.fr/myriads/ser-os/workshop09/system_level_virtualization_for_hpc-Thomas_Naughton_and_Geoffroy_Vallee.ppt>.*
"LHM—Loadable Hypervisor Modules." Oak Ridge National Laboratory Computer Science and Mathematics Division. n. p., Nov. 2, 2009. Web. Feb. 21, 2015. <http://www.csm.ornl.gov/srt/lhm>.*
Boileau, Adam, "Hit by a Bus: Physical Access Attacks with Firewire," Security-assessment.com, Presented at Ruxcon 2006, copyright Security-assessment.com 2006, 36 pages.
Corelis, Tom, "Lock Your Workstations, or Not: New Tool Bypasses Windows Logon," Dailytech.com, Blog, Mar. 7, 2008, accessed Nov. 15, 2013, 2 pages.
Patel, Nilay, "Windows passwords easily bypassed over Firewire," Engadget.com, Mar. 4, 2008, accessed Nov. 15, 2013, 2 pages.
"Windows login bypass tool released," H-online.com, Mar. 6, 2008, accessed Nov. 15, 2013, 3 pages.

* cited by examiner

*Primary Examiner* — Wei Zhen
*Assistant Examiner* — Binh Luu
(74) *Attorney, Agent, or Firm* — Klarquist Sparkman, LLP

(57) ABSTRACT

An example method of updating code or variables may include storing a program and/or variables of the program in a memory of a computer. The program may be executed using at least a first processor in the computer. After receiving a request over a network from a hot patching service, a second processor may execute patch software. The second processor may be exposed as a peripheral device to the computer, the second processor having access to the memory of the computer. Without stopping execution of the program, the program and/or variables of the program may be updated using the patch software by changing the stored program and/or variables in the memory using the second processor. The computer may be a server computer used in a multi-tenant virtual environment, and the program may be a hypervisor running on the server computer.

19 Claims, 8 Drawing Sheets

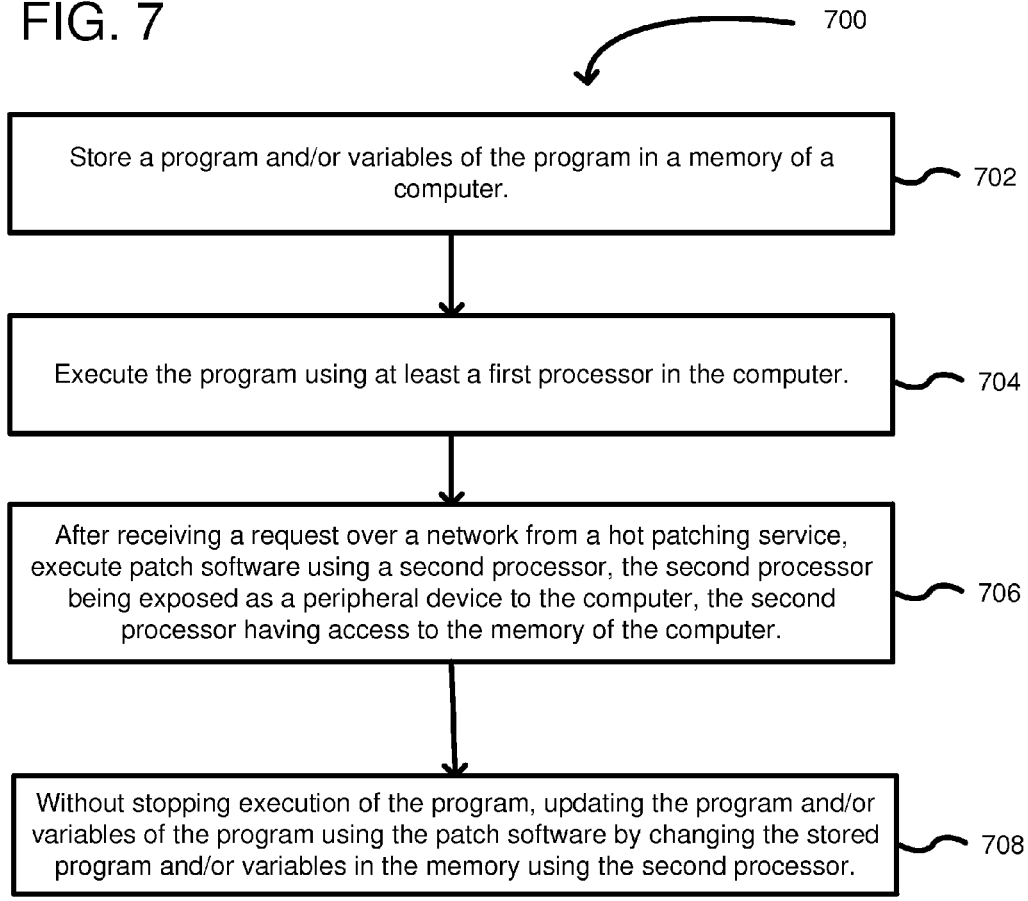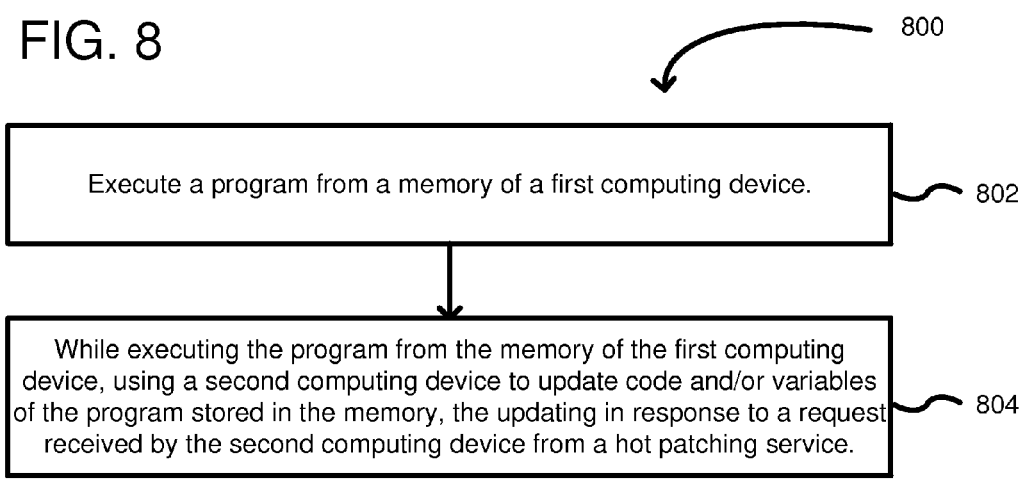

HOT PATCHING TO UPDATE PROGRAM CODE AND/OR VARIABLES USING A SEPARATE PROCESSOR

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs. Therefore, programs (e.g., operating system and management programs) on the server computers in the cloud computing environment need to run optimally, without any vulnerabilities or "bugs."

One way to keep programs running optimally is to use patches. A patch (or patch software) is a piece of software which may be used to update a program running on a computing device to fix any known security vulnerabilities, performance deficiencies or other known program bugs, or to further improve usability and performance of the program. One way to deploy patch software is to change the targeted program code as stored on the device hard drive. However, this type of patching may be inefficient, especially in a cloud computing environment with multiple computing devices, since deployment of the patched software requires restart of the computing device after the program code patching is complete, causing interruption of all programs executing on the computing devices.

Another way to deploy patching is to use hot patching, which is the application of a patch to a program without restarting the computing device. However, hot patching may be hard to apply in instances when the target program is a management program that provides limited (or no) access to the program code.

BRIEF DESCRIPTION OF THE DRAWINGS

FIG. 7 is a flowchart of another example method supporting hot patching of an in-memory program according to an example embodiment.

FIG. 8 is a flowchart of yet another example method supporting hot patching of an in-memory program according to an example embodiment.

DETAILED DESCRIPTION

The following description is directed to techniques and solutions supporting hot patching of an in-memory program and/or variables. For example, in one embodiment, the program and/or variables are updated using a baseboard management controller (BMC). In a virtual computing environment, a host server computer can run one or more virtual machines using a management program, such as a hypervisor. Patching the hypervisor, especially the hypervisor code and/or variables loaded in memory, may be challenging since the hypervisor runs in a restricted (e.g., management) mode that does not expose the host server memory for any changes by the control domain.

Figure 1:
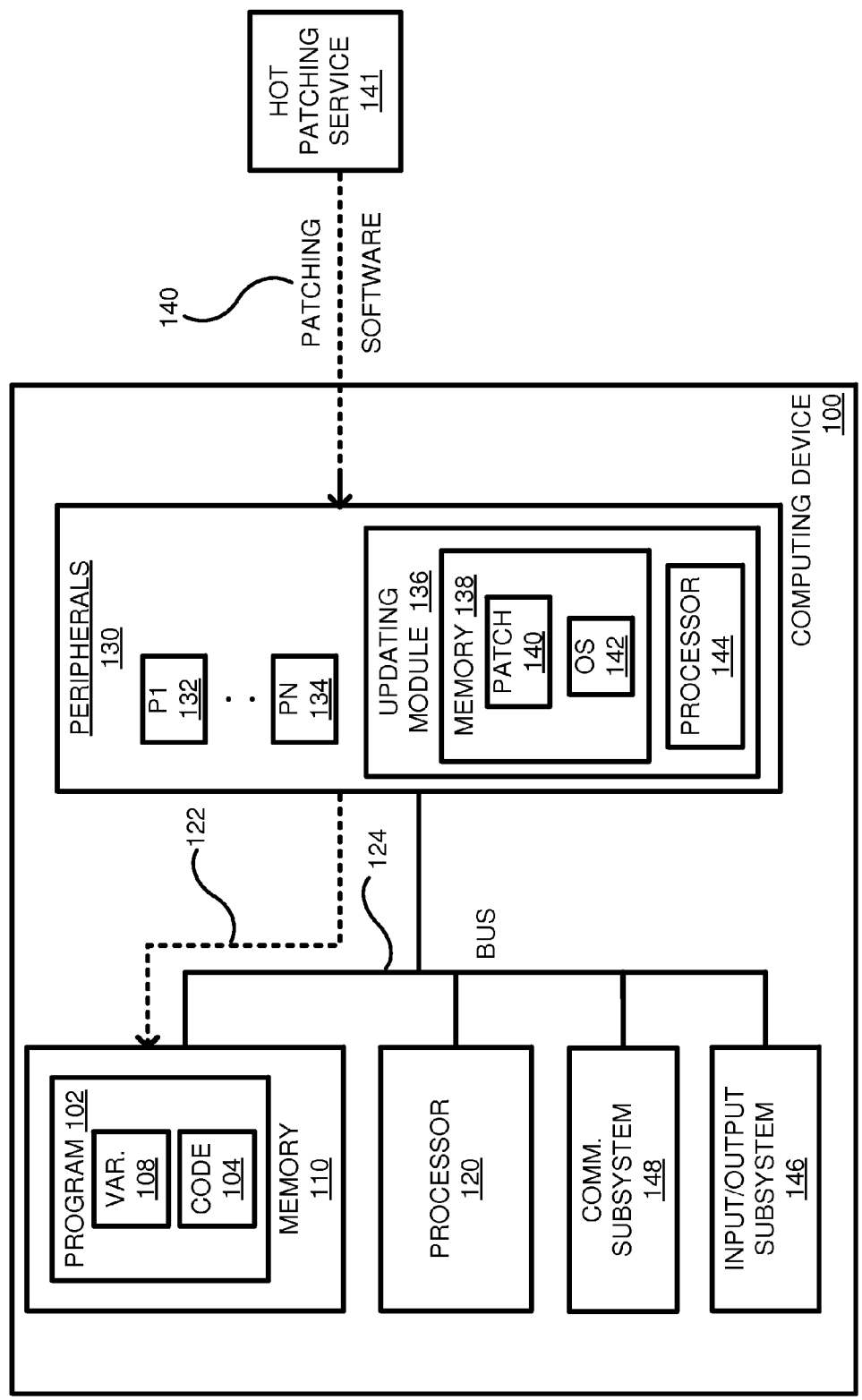
FIG. 1 is a diagram of an example environment supporting hot patching of in-memory code, in accordance with an embodiment of the disclosure.

A host server running a hypervisor may also use a BMC as a service processor that monitors the physical state of the server (e.g., the BMC communicates with a variety of sensors inside the server, such as temperature sensors, power supply sensors, and so forth), collects the sensor data and communicates with an administrator. The BMC may have its own processor and memory that are separate from the processor and memory of the host server, such that the BMC appears as a peripheral device to the host server processor. Additionally, the BMC has direct memory access capabilities for reading/writing to the host server memory for purposes of enabling high-speed communication between the host and the BMC. In this regard, the BMC's capability to access the memory of the host server may be used to hot patch in-memory code (e.g., instructions/code and/or variables of the hypervisor that have been loaded in host memory). For example, patching software may be loaded into the BMC's own memory and executed by the BMC's processor to grant access to the host server memory to hot patch in-memory code stored in the memory. Such hot patching may be performed by the BMC on-the-fly, while the host server's operating system (and the hypervisor) are running on the host server processor FIG. 1 is a diagram of an example environment supporting hot patching of an in-memory program and/or variables, in accordance with an embodiment of the disclosure. Referring to FIG. 1, there is illustrated a computing device 100 supporting hot patching functionalities as described herein. The computing device 100 may be, for example, a server computer (e.g., the server computer 200 in FIG. 2 or any other server computer described herein) providing computing resources in a virtual computing environment. The computing device 100 may comprise system memory 110, a CPU (or a processor) 120, peripherals 130, a communication subsystem 148, and an input/output (I/O) subsystem 146. The computing device may also comprise one or more programs, such as program 102, running from memory 110. As indicated, the program 102 includes program code (or instructions) 104 and program variables 108. In an example implementation, the program 102 may be an operating system, such as a hypervisor (with functionalities described herein below). The various components of the computing device may be interconnected by bus 124, which may comprise one or more different types of buses, such as a main (system) bus and a peripheral bus (e.g., a PCI bus).

The processor 120 may comprise suitable logic, circuitry, interfaces, and/or code that may be operable to process data, and/or control and/or manage operations of the computing device 100, and/or tasks and/or applications performed therein in connection with functionalities described herein. In this regard, the processor 120 may be operable to configure and/or control operations of various components and/or subsystems of the computing device 100, by utilizing, for example, one or more control signals. The processor 120 enables running and/or execution of applications, programs and/or code (e.g., the program 102), which may be executed, for example, from the memory 110.

The memory 110 may comprise suitable logic, circuitry, interfaces, and/or code that may enable permanent and/or non-permanent storage, buffering and/or fetching of data, code and/or other information, which may be used, consumed, and/or processed. In this regard, the memory 110 may comprise different memory technologies, including, for example, read-only memory (ROM), random access memory (RAM), Flash memory, solid-state drive (SSD), and/or field-programmable gate array (FPGA). The memory 110 may store, for example, configuration data, which may comprise parameters, variables and/or code, comprising software and/or firmware (e.g., the program 102 with program code 104 and program variables 108).

The communication subsystem 148 may comprise suitable logic, circuitry, interfaces, and/or code operable to communicate data from and/or to the computing device 100, such as via one or more wired and/or wireless connections. The communication subsystem 148 may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, Bluetooth, and/or any other available wireless protocol/interface), facilitating transmission and/or reception of signals to and/or from the computing device 100, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation. In accordance with an embodiment of the disclosure, the communication subsystem 148 may provide wired and/or wireless connections to, for example, other computing devices (e.g., other server computers) within a virtual computing environment.

The I/O subsystem 146 may comprise suitable logic, circuitry, interfaces, and/or code for enabling user interactions with the computing device 100, enabling obtaining input from user(s) and/or providing output to the user(s). The I/O subsystem 146 may support various types of inputs and/or outputs, including, for example, video, audio, and/or textual. In this regard, dedicated I/O devices and/or components, external to or integrated within the computing device 100, may be utilized for inputting and/or outputting data using operations of the I/O subsystem 146.

The peripherals 130 may comprise one or more peripheral devices, such as peripherals 132, . . . , 134 (any number of peripherals can be used as is indicated by the variable "N"). Additionally, the computing device 100 may also include an updating module 136, which may be connected to the computing device 100 as a peripheral. The peripheral devices 132, . . . , 134 may be peripheral devices that are internal to the computing device 100.

The updating module 136 may comprise suitable logic, circuitry, interfaces, and/or code and may be operable to provide access to the system memory 110 (e.g., direct memory access or DMA) for purposes of performing hot patching of in-memory code and/or variables stored in the system memory 110. In this regard, the updating module 136 may comprise its own memory 138 and processor 144. The memory 138 may be used by the processor 144 to run an operating system 142 of the updating module 136, as well as one or more programs (e.g., the patching software 140), with the operating system 142 running independently of the program 102 of the computing device 100. The updating module 136 may be a peripheral device that is dedicated to providing access to the system memory 110 for performing hot patching of in-memory code. However, in another example implementation, the updating module may also provide other service functionalities (e.g., monitoring functions as explained herein below) in addition to the hot patching functionalities. As described in other embodiments, the updating module 136 can be a baseboard management controller (BMC). Other updating modules can be used. In some embodiments, the updating module may itself function as a server computer, and the memory 110 may be seen as a peripheral by the updating module.

In operation, the computing device 100 may receive (e.g., via the communication subsystem 148) patching software 140 from a hot patching service 141 using a communication network (e.g., wired and/or wireless network). The communication network between the hot patching service 141 and the communication device 100 may comprise a local area network (LAN) or a wireless LAN (WLAN) consisting of a few computers, or it can include many computers distributed over geographic regions. Additionally, the communication network may include a combination of any other types of wired and/or wireless networks and/or the Internet. The patching software 140 may be stored in memory 138 of the updating module 136. Upon execution of the patching software 140 by the processor 144, the updating module 136 may access the memory 110 via communication path 122. More specifically, the updating module may access and hot patch the program code 104 and/or the program variables 108. During the hot patching, the updating module 136 (e.g., the processor 144) may locate one or more bytes within the code 104 and/or the variables 108 and may replace them with updated bytes. The communication path 122 may be part of the bus 124 or it may be a dedicated connection between the updating module 136 and the memory 110. Additionally, the updating module 136 may be configured to access the memory 110 and perform hot patching of in-memory code (e.g., code 104 and/or variables 108) while the processor 120 is executing the program 102 from the memory 110.

Figure 2:
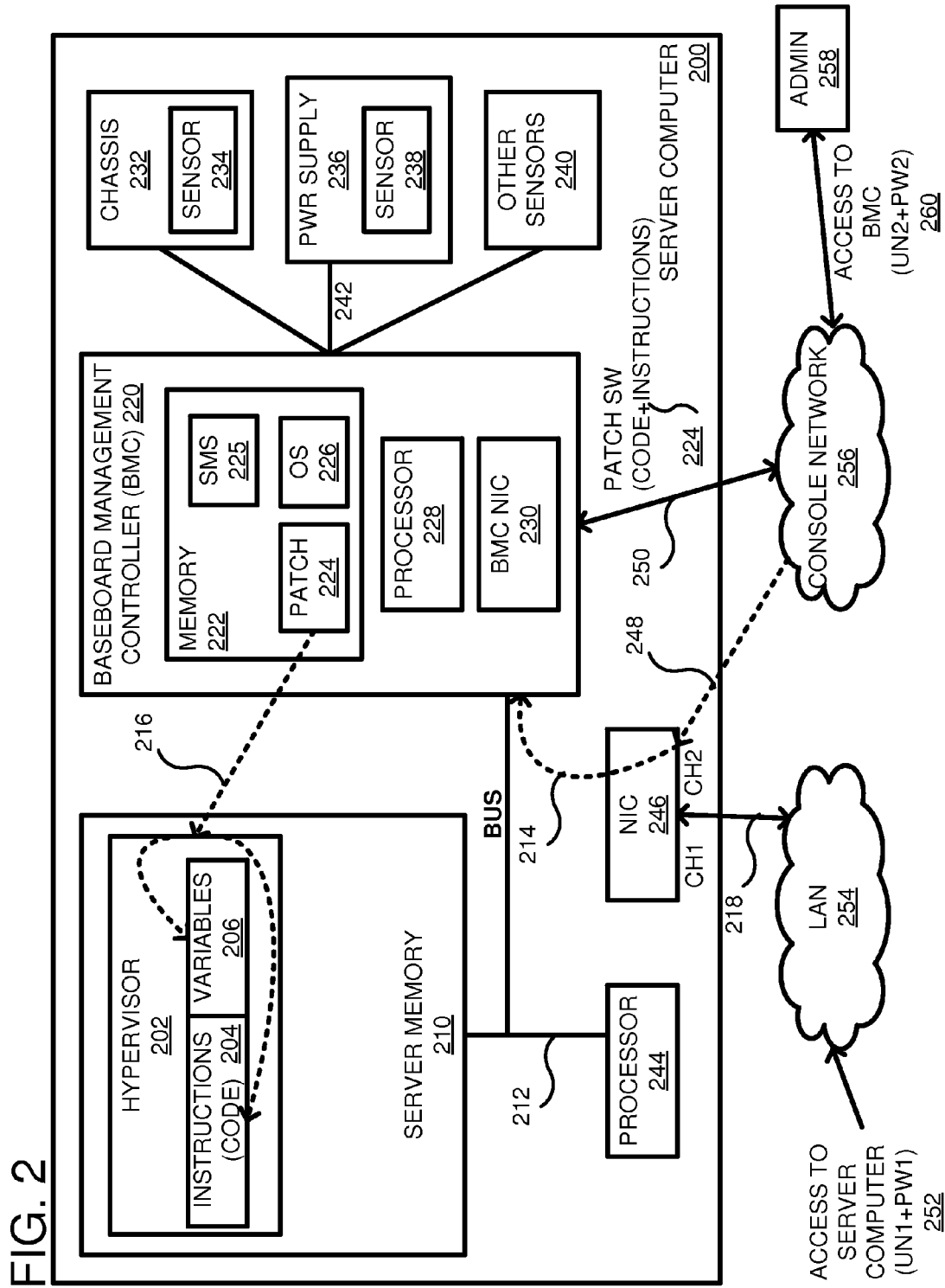
FIG. 2 is a diagram of an example environment supporting hot patching of in-memory code using a baseboard management controller (BMC), in accordance with an embodiment of the disclosure.

FIG. 2 is a diagram of an example environment supporting hot patching of in-memory code using a BMC, in accordance with an embodiment of the disclosure. Referring to FIG. 2, there is illustrated a server computer 200, which supports hot patching using a BMC.

The server computer 200 may operate in a virtual computing environment and may perform functionalities related to the virtual computing environment as described in greater detail herein below in reference to FIGS. 5-7. For example, the server computer 200 may be configured to provide computing resources for executing software instances using a hypervisor, such as the hypervisor 202. In this regard, the server computer 200 may comprise a processor 244, server memory 210, a network interface card (NIC) 246, a BMC 220, chassis 232, power supply 236 and other sensors 240. Even though FIG. 2 illustrates the server computer to comprise only the above listed modules, such illustration in FIG. 2 is only for simplicity and the present disclosure may not be limited in this regard (e.g., the server computer 200 may also include any of the modules used by the computing device 100 as illustrated in FIG. 1).

The server memory 210 may be similar in functionality to the memory 110. Additionally, the memory 210 may also be used by the processor 244 to run one or more programs, such as the hypervisor 202.

The BMC 220 may comprise suitable logic, circuitry, interfaces, and/or code and may be used to perform system management functionalities related to the server computer 200. For example, the BMC 220 may implement an intelligent platform management interface (IPMI) (or another type of a management interface) for out-of-band management of various components within the server computer 200 as well as monitoring the server's operation.

For example, the BMC 220 may monitor system "health" parameters such as power supply status, cooling fan speed, chassis temperature, server OS status, and so forth, using one or more sensors (e.g., sensor 234 within the chassis 232, sensor 238 within the power supply 236, and/or other sensors 240). The BMC 220 may be implemented as an internal peripheral device within the server computer 200 (e.g., an embedded microcontroller), with its own processor 228 and memory 222. Alternatively, the BMC can be implemented as an external peripheral device, such that it is coupled to the server computer 200 through a cable. The BMC processor 228 may execute the BMC operating system 226 (which is different from and independent of the hypervisor 202) from the memory 222. The BMC processor 228 may also execute other programs from the memory 222, such as system management software 225 and/or patch software 224.

The system management software 225 may be used by the BMC processor 228 to receive and process data related to the BMC's system management functionalities (e.g., monitoring of the system "health" parameters), and provide corresponding alerts or notifications (e.g., to the administrator 258). For example, the BMC processor 228 may provide the administrator 258 with notifications via the console network 256, if any of the parameters do not stay within limits, indicating a potential problem with the monitored subsystem/module.

Communication within the server computer 200 may take place using one or more buses, such as bus 212 and bus 242. The buses 212, 242 may combine one or more different bus types, such as a system bus, a peripheral bus and so forth. In an example embodiment, the BMC 220 may be implemented as a PCI card coupled as a peripheral to the server computer 200 via a PCI express bus. Additionally, the server computer 200 may comprise a NIC 246, which may comprise suitable logic, circuitry, interfaces, and/or code and may be operable to provide access to the server computer 200 via the communication network (e.g., a local area network, or LAN) 254. Access 252 to the server computer 200 via the LAN 254 and communication path 218 (e.g., wired and/or wireless) may be secured by a first user name (UN1) and a first password (PW1).

The BMC 220 may comprise its own NIC 230, which may be used (e.g., by a system administrator 258) for accessing the BMC 220 as well as any other components within the server computer 200 that the BMC 220 provides access to. More specifically, the system administrator 258 may access and communicate with the BMC 220 via the console network 256 and communication path 250 (e.g., wired and/or wireless). Access 260 to the BMC 220 may be secured by a second user name (UN2) and a second password (PW2). The console network 256 may be a wired and/or wireless management network that communicatively couples a plurality of BMCs (e.g., as illustrated in FIG. 5) and provides secured (e.g., password-protected) access (e.g., to a network administrator 258) for purposes of accessing and communicating with the BMCs (e.g., BMC 220). Example communications using the console network 256 include receiving system notifications or alerts from the BMC 220, dispatching (or uploading) software (e.g., patching software 224) to the BMC memory 222, communicating patching instructions for the patching software 224, and other network management communications.

In an example embodiment of the disclosure, the BMC 220 may be used for the accessing and hot patching of programs running from the server memory 210, such as the hypervisor 202. For example, the system administrator may have password-protected access 260 (e.g., using UN2 and PW2) to the console network 256, and may upload patching software 224 to the BMC memory 222 via the communication path 250 and the BMC NIC 230. The patching software 224 may include patching software code and patching instructions. Upon execution by the BMC processor 228, the patching software 224 may give the BMC 220 access to the server memory 210 via communication path 216. The communication path 216 may be part of the server bus 212 or it may be a dedicated bus used exclusively by the BMC 220 to access memory 210. The instructions within the patching software 224 may indicate where the hot patch should be applied (e.g., which in-memory bytes to locate within memory 210 and which bytes to replace the located bytes with).

Upon execution of the patching software 224 by the BMC processor 228, the BMC 220 may access the memory 210 via communication path 216. During the hot patching, the BMC 220 may access and hot patch the hypervisor instructions (or code) 204 and/or the hypervisor variables 206 (as indicated by the dotted arrows in FIG. 2). To perform the in-memory patching, the BMC 220 (e.g., the BMC processor 228) may locate one or more bytes within the code 204 and/or the variables 206 and may replace them with updated bytes (as specified by the patching instructions that are part of the software patch 224). The BMC 220 may be configured to access the memory 210 and perform hot patching of in-memory code (e.g., code 204) and/or variables 206 while the server processor 244 is executing the hypervisor 202 from the memory 210.

Optionally and prior to performing hot patching of any in-memory code and/or variables, the BMC 220 may check whether the memory 210 is in a certain "current" (or known) state. The hot patching may then proceed if the memory 210 is in the known state so as to avoid timing issues where the program being changed is also being executed. Alternatively, the "current" (or known) state of the memory may be overwritten to a "desired" (or a new) state by patching (or changing) the in-memory code 204 and/or variables 206 in accordance with the instructions of the patching software 224.

In an example embodiment, the BMC 220 may be adapted to communicate with the management console network 256 using the NIC 246 of the server computer 200. For example, the NIC 246 may implement two separate communication channels (e.g., CH1 and CH2), with CH1 being used by the LAN 254 for communications with the server computer 200, and CH2 being used for dedicated communication between the console network 256 and the BMC 220 using the communication paths 248 and 214. Regardless of whether a single (e.g., dual-channel) NIC 246 is used within the server computer 200, or the BMC uses its own NIC 230, access to memory 210 may be achieved either via two separate communication networks (e.g., LAN 254 and console network 256), which access (252 and 260) may be secured (e.g., by passwords PW1 and PW2, respectively). In an example implementation of the disclosure, the networks 254 and 256 may be part of the same network (e.g., only one network may be used in place of two separate networks 254 and 256). In such implementation, communications with the server computer 200 and the BMC 220 may take place using the NIC 246. In any of the embodiments, a separate IP address can be used for each of the server computer 200 and the BMC 220. Additionally, the communication networks 254 and 256 may comprise one or more local area networks (LANs) or one or more wireless LANs (WLANs) consisting of a few computers, or it can include many computers distributed over geographic regions. Additionally, the communication networks 254 and 256 may each include a combination of any other types of wired and/or wireless networks and/or the Internet.

Figure 3:
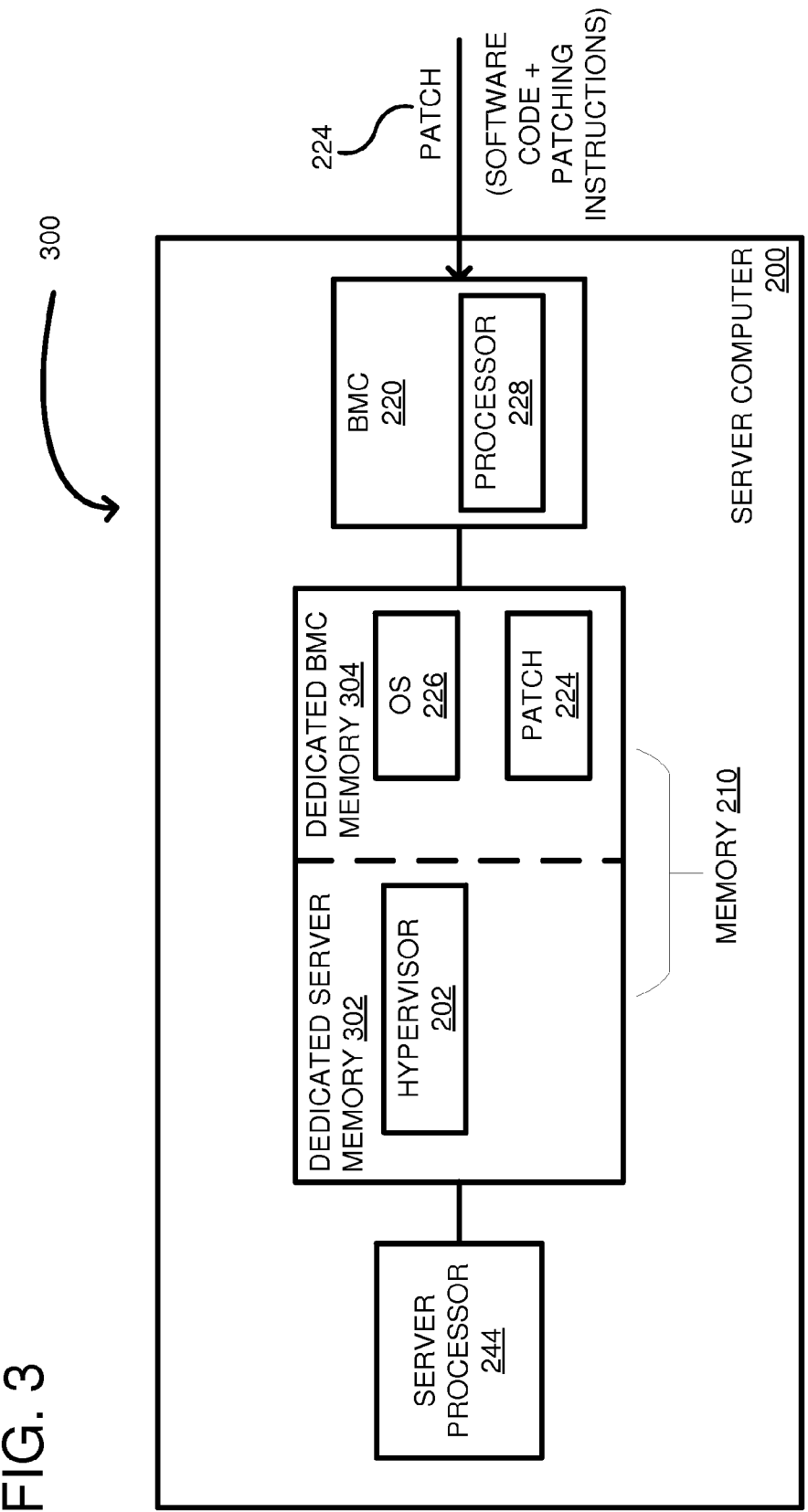
FIG. 3 is a diagram of an example environment supporting hot patching of in-memory code using a baseboard management controller (BMC) in a cooperative setup sharing server memory, in accordance with an embodiment of the disclosure.

FIG. 3 is a diagram of an example environment supporting hot patching of in-memory code using a baseboard management controller (BMC) in a cooperative setup 300 sharing server memory, in accordance with an embodiment of the disclosure. Referring to FIG. 3, there is illustrated an example cooperative setup 300 within the server computer 200, where the BMC processor 228 and the server processor 244 share the server memory 210. More specifically, the server processor 244 may allocate a portion 304 of the memory 210 for exclusive use by the BMC 220. The BMC 220 may then use the allocated BMC memory 304 to store and run the BMC OS 226 and the patch software 224. The remaining portion of the memory 210 may be used as allocated server memory 302, for purposes of running the hypervisor 202. Like the embodiment of FIGS. 1 and 2, a hot patching service (not shown) can be coupled through a network to the server computer 200 in order to supply the patch 224.

Figure 4:
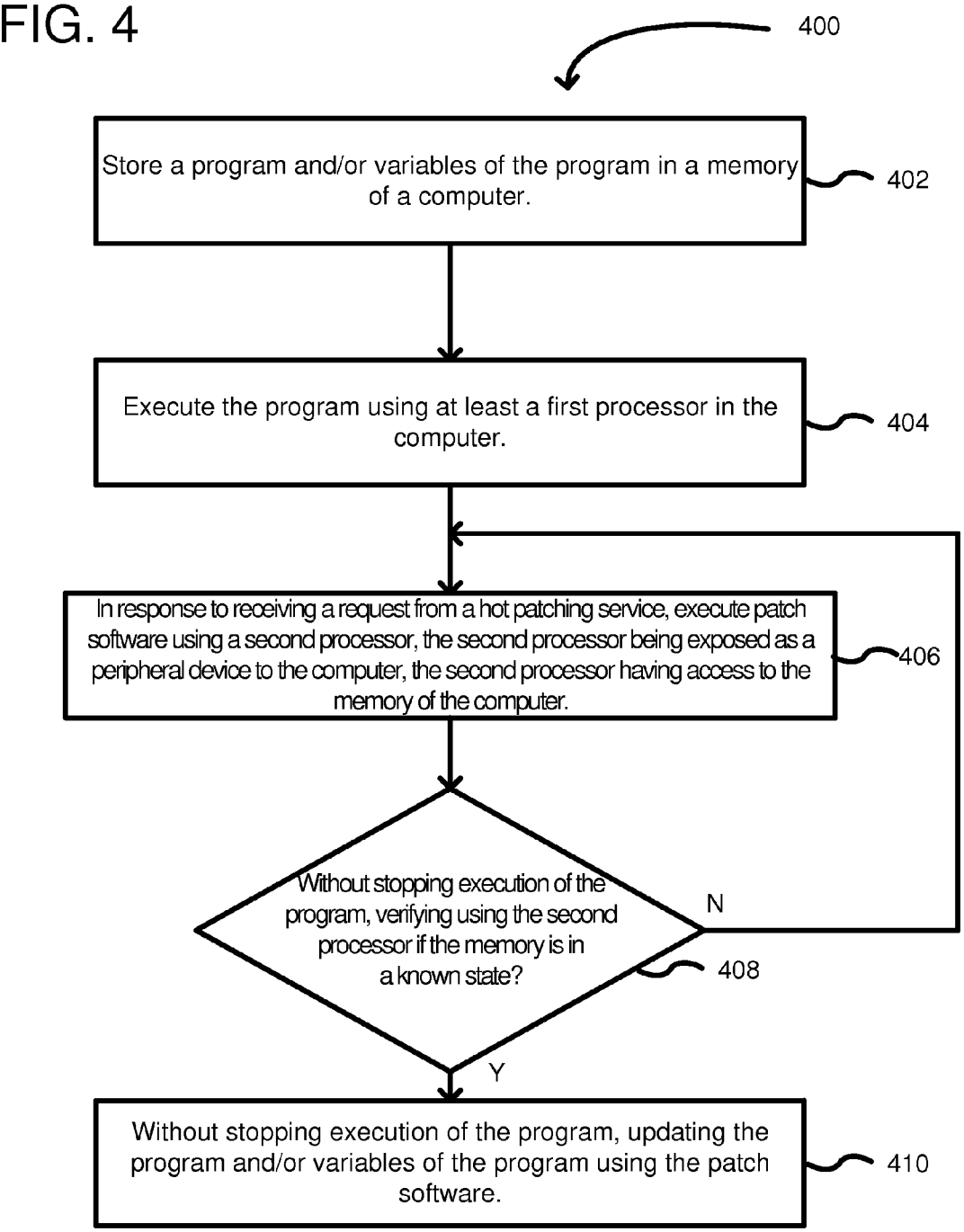
FIG. 4 is a flowchart of an example method supporting hot patching of in-memory code according to an example embodiment.

FIG. 4 is a flowchart of an example method supporting hot patching of in-memory code according to an example embodiment. Referring to FIGS. 2 and 4, the example method 400 may start at 402, when a program and/or variables of the program may be stored in a memory of a computer. For example, instructions/code 204 and/or variables 206 of the hypervisor 202 may be stored in the memory 210 of server computer 200. At 404, the program may be executed using at least a first processor in the computer. For example, the hypervisor 202 may be executed using the server processor 244.

At 406, in response to receiving a request from a patching service, patch software may be executed using a second processor (which can be coupled to the patching service through a network connection), the second processor being exposed as a peripheral device to the computer, the second processor having access to the memory of the computer. For example, the BMC 220, which has access to the server memory 210 (e.g., direct memory access, or DMA, via communication path 216), may be seen by the server computer 200 as a peripheral. The BMC 220 may receive (e.g., via console network 256 and NIC 230 or NIC 246) patching software 224 (e.g., patching software code and patching instructions). The patching software 224 may be executed by the BMC processor 228 while the hypervisor 202 is running from the memory 210.

At 408, without stopping execution of the program, the second processor may verify if the memory is in a known state. While the hypervisor 202 is executing, the BMC processor 228 may verify if the server memory 210 is in a known state. Additionally, the BMC processor 228 may search for certain bytes (in-memory code) according to the patching instructions within the patching software 224. After confirming the memory 210 is in the known state (and the in-memory bytes identified for patching are located), at 410, the instructions/code 204 and/or variables 206 of the hypervisor 202 may be updated, while the hypervisor 202 is still running from memory 210. If the memory is not in a known state at 408, then a feedback loop can be used, such as by repeating process block 406. Other desired error correction procedures can be used.

Figure 5:
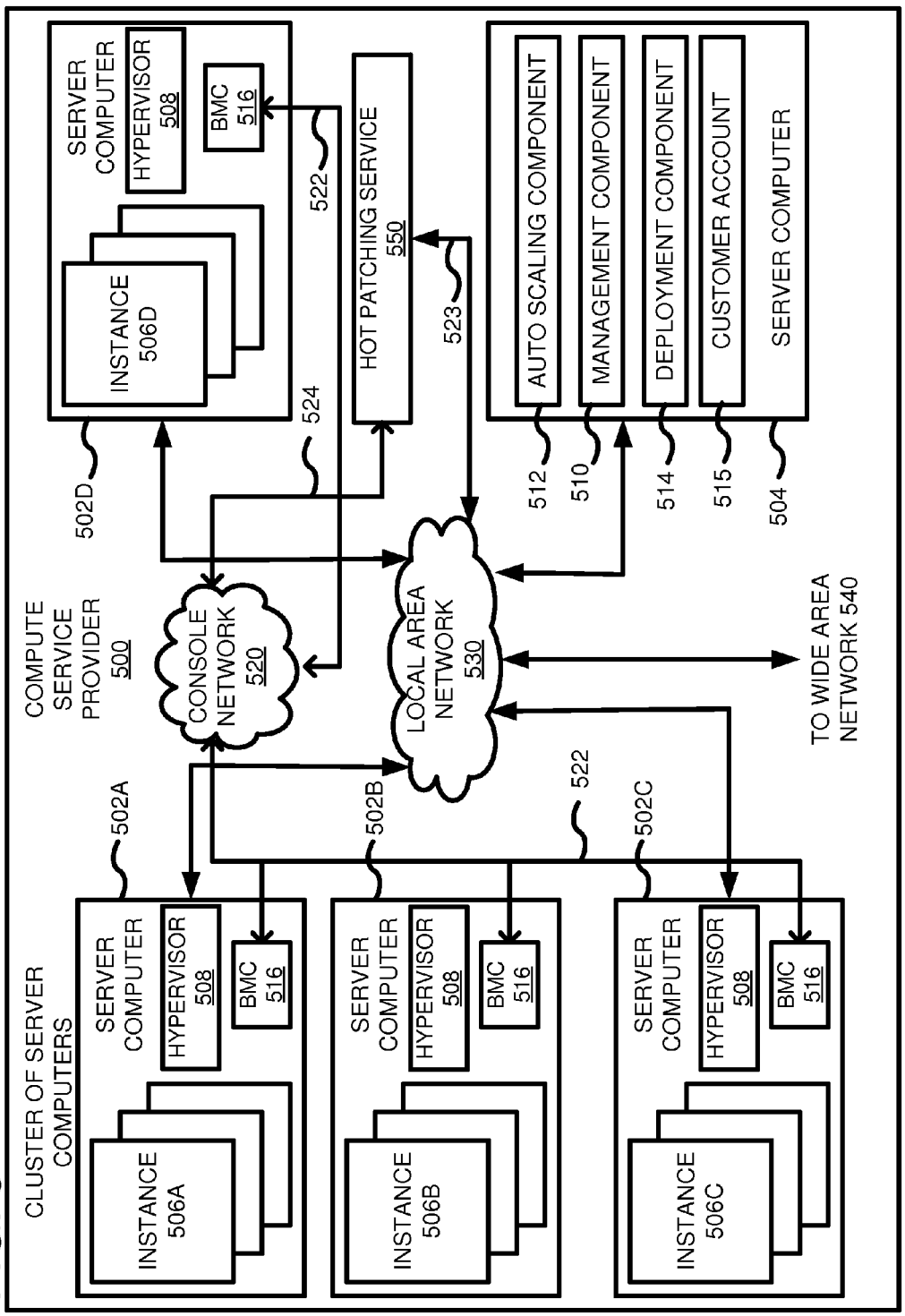
FIG. 5 is an example system diagram showing a plurality of virtual machine instances running in a multi-tenant environment, using a hot patching service according to one embodiment.

FIG. 5 is an example system diagram showing a plurality of virtual machine instances running in a multi-tenant environment, using a hot patching service according to one embodiment. More specifically, FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients.

In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e., a computer) that executes applications like a physical machine. In the example, each of the server computers 502A-502D can be configured to execute a hypervisor 508 or another type of program configured to enable the execution of multiple instances 506 on a single server. For example, each of the servers 502A-502D can be configured (e.g., via the hypervisor 508) to support one or more virtual machine partition, with each virtual machine partition capable of running a virtual machine instance (e.g., server computer 502A could be configured to support three virtual machine partitions each running a corresponding virtual machine instance). Additionally, each of the instances 506 can be configured to execute one or more applications.

In an example embodiment, each of the server computers 502A-502D may also comprise a BMC 516 communicatively coupled to the console network 520 (which may be similar to the console network 256 in FIG. 2). The BMCs 516 may perform functionalities that are similar to the functionalities described herein in reference to the BMC 220 in FIG. 2. Such functionalities may include, for example, performing hot patching of in-memory code and/or variables (e.g., code and/or variables associated with the hypervisor 508), as explained in greater detail in reference to FIGS. 1-4.

The compute service provider 500 may also comprise hot patching service 550. The hot patching service 550 may comprise suitable logic, circuitry, interfaces, and/or code and may be operable to communicate with the BMCs 516 using the console network 520 and the communication paths 524 and 522 (which may comprise wired and/or wireless communication links). For example, the hot patching service 550 may provide a user interface to an administrator (e.g., 258) for obtaining secure access (e.g., password-protected access) to the console network 520 and to one or more of the BMCs 516. In some implementations, the hot patching service 550 may be managed via a network 530 and communication path 523. As previously described, each BMC 516 can have an independent IP address separate from an IP address of its associated server computer 502. Additionally, the networks 520 and 530 can be combined. The hot patching service 550 may be used for uploading patching software to one or more of the BMCs 516 for purposes of performing hot patching of in-memory code and/or variables (e.g., code and/or variables associated with the hypervisor 508) stored at the server memory of one or more of the server computers 502A-502D. The hot patching service may be implemented in a dedicated server (similar to the servers 502A-502D), or may be implemented as part of the server computer 504 that performs management functions. For example, the hot patching service 550 may be implemented as part of the management component 510.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component 510 can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 530 can be utilized to interconnect the server computers 502A-502D and the server computer 504. The network 530 can be a local area network (LAN) and can be connected to a Wide Area Network (WAN) 540 so that end-users can access the compute service provider 500. Additionally, the BMCs 516 within the server computers 502A-502D and the hot patching service 550 may be interconnected using the console network 520. The console network 520, as explained herein, is a management network that is restricted for access by end users and may be password-protected, granting access only to authorized operators (e.g., network administrators) of the hot patching service 550.

It should be appreciated that the network topology illustrated in FIG. 5 has been simplified and that many more networks and networking devices can be utilized to interconnect the various computing systems disclosed herein.

Figure 6:
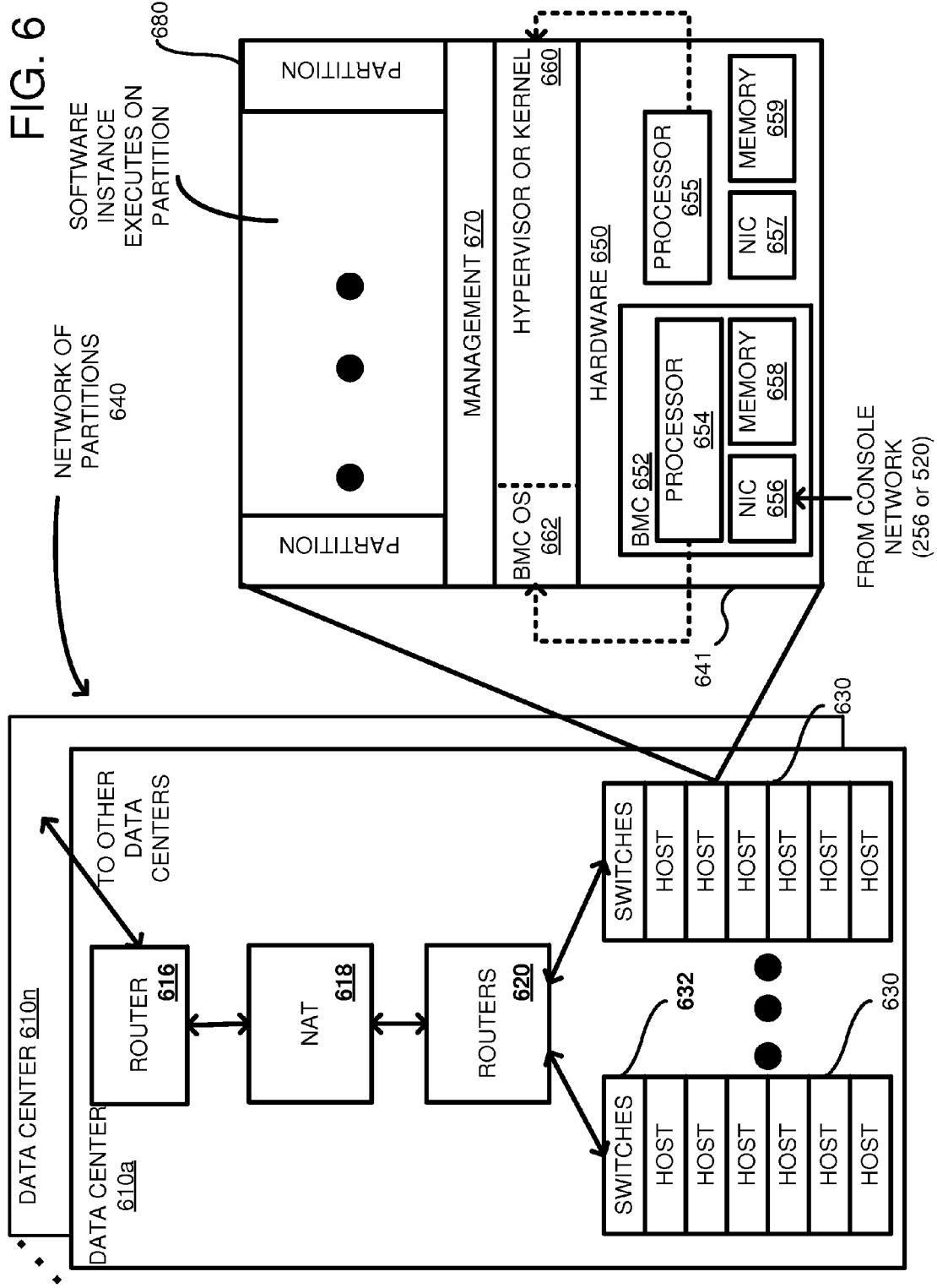
FIG. 6 shows an example of a plurality of host computers, routers, and switches—which are hardware assets used for running virtual machine instances—with the host computers using a baseboard management controller (BMC) to hot patch in-memory code according to one embodiment.

FIG. 6 shows an example of a plurality of host computers, routers, and switches—which are hardware assets used for running virtual machine instances—with the host computers using a baseboard management controller (BMC) to hot patch in-memory code according to one embodiment. More specifically, FIG. 6 illustrates the network of partitions 640 and the physical hardware associated therewith. The network of partitions 640 can include a plurality of data centers, such as data centers 610a, . . . , 610n, coupled together by routers, such as router 616. The router 616 reads address information in a received packet and determines the packet's destination. If the router decides that a different data center contains a host server computer, then the packet is forwarded to that data center. If the packet is addressed to a host in the data center 610a, then it is passed to a network address translator (NAT)

618 that converts the packet's public IP address to a private IP address. The NAT 618 also translates private addresses to public addresses that are bound outside of the data center 610a. Additional routers 620 can be coupled to the NAT 618 to route packets to one or more racks 630 of host server computers. Each rack 630 can include a switch 632 coupled to multiple host server computers. A particular host server computer is shown in an expanded view at 641.

Each host 641 has underlying hardware 650 including one or more CPUs (e.g., processor 655), memory (e.g., memory 659), a network interface card (NIC) 657, storage devices, etc. The hardware layer 650 may implement the hardware elements of the host 641 (e.g., processor 655, NIC 657, and memory 659), as well as a BMC 652 (which may be the same as the BMCs 516 and 220). Each BMC 652 may include a BMC processor 654, memory 658, and a NIC 656, all being part of the hardware layer 650. The BMC NIC 656 may be used for communicating with the console network 520 (or 256).

Running a layer above the hardware 650 is a hypervisor or kernel layer 660. The hypervisor or kernel layer 660 can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 670 can be part of the hypervisor or separated therefrom and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

The BMC operating system 662 may be executed by the BMC processor 654 using the BMC memory 658, and may running above the hardware layer 650, as part of the kernel layer 660. Similarly, an operating system for the host 641 (e.g., a hypervisor) may be executed by the processor 655 using the memory 659, and may also be running above the hardware layer 650.

Any applications executing on the instances can be monitored using the management layer 670, which can then pass the metrics to a health monitoring service for storage in a metrics database. Additionally, the management layer 670 can pass to a monitoring service the number of instances that are running, when they were launched, the operating system being used, the applications being run, etc. All such metrics can be used for consumption by the health monitoring service and stored in a database for subsequent use.

FIG. 7 is a flowchart of another example method supporting hot patching of an in-memory program according to an example embodiment. Referring to FIGS. 2 and 7, the example method 700 may start at 702, when a program and/or variables of the program may be stored in a memory of a computer. For example, instructions/code 204 and/or variables 206 of the hypervisor 202 may be stored in the memory 210 of server computer 200. At 704, the program may be executed using at least a first processor in the computer. For example, the hypervisor 202 may be executed using the server processor 244.

At 706, after receiving a request over a network from a hot patching service, patch software may be executed using a second processor. The second processor may be exposed as a peripheral device to the computer, and the second processor may have access to the memory of the computer. For example, the BMC 220, which has access to the server memory 210 (e.g., direct memory access, or DMA, via communication path 216), may be exposed as a peripheral device to the server computer 200. Likewise, the server computer 200 may be exposed as a peripheral device to the BMC (thus each of the server computer and the peripheral device can independently appear like peripheral devices to each other. As such each can operate independently as if they are separate computers with independent operating systems, but with a shared power supply). The BMC may receive a request for hot patching of in-memory code (or variables) from a hot patching service (e.g., 550). The BMC 220 may receive (e.g., via console network 256 and NIC 230 or NIC 246) patching software 224 (e.g., patching software code and patching instructions). The patching software 224 may be executed by the BMC processor 228 while the hypervisor 202 is running from the memory 210.

At 708, without stopping execution of the program, the second processor may update the program and/or variables of the program using the patch software, by changing the stored program and/or variables in the memory. While the hypervisor 202 is executing, the BMC processor 228 may update the instructions/code 204 and/or variables 206 of the hypervisor 202 using the patch software 224.

FIG. 8 is a flowchart of yet another example method supporting hot patching of an in-memory program according to an example embodiment. Referring to FIGS. 2 and 8, the example method 800 may start at 802, when a program may be executed from a memory of a first computing device. For example, instructions/code 204 and/or variables 206 of the hypervisor 202 may be stored in, and executed from, the memory 210 of the server computer 200 by the server processor 244. At 804, while executing the program from the memory of the first computing device, code and/or variables of the program stored in the memory may be updated using a second computing device. The updating may be in response to a request received by the second computing device from a hot patching service. For example, while the hypervisor 202 is being executed from the memory 210 of the server computer 200, instructions/code 204 and/or variables 206 of the hypervisor 202 may be updated (e.g., may be hot patched) using the BMC 220. The updating may be in response to a request for hot patching of in-memory code (or variables) received by the BMC 220 from a hot patching service (e.g., 550).

Additionally, the first computing device (e.g., the server computer 200) may run a program (e.g., an operating system such as the hypervisor 202) that is independent of an operating system (e.g., BMC OS 226) running on the second computing device (e.g., BMC 220). The second computing device (e.g., BMC 220) may be peripherally connected to the first computing device (e.g., 200) using a bus (e.g., 212, 216). The second computing device (e.g., BMC 220) may have memory access to the memory (e.g., 210) of the first computing device (e.g., 200) via the bus (e.g., 212 and/or 216).

Figure 9:
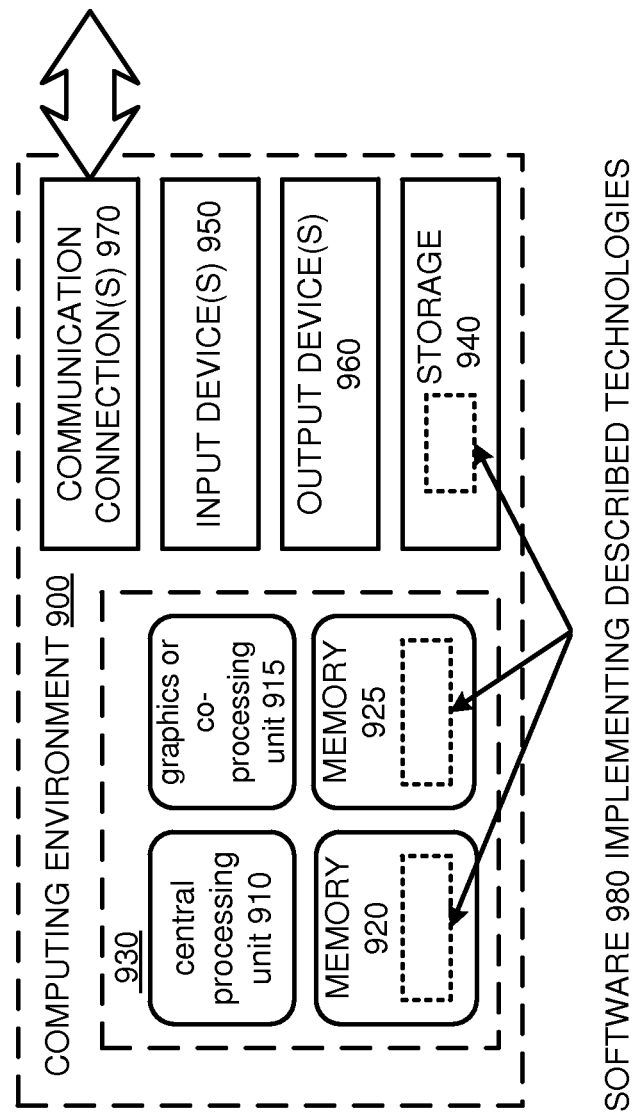
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method of updating a program and/or variables, comprising:
   storing a program and/or variables of the program in a memory of a computer, the memory being accessible by at least a first processor in the computer;
   executing the program using the at least first processor;
   receiving patch software at a second processor, the second processor being exposed as a peripheral device to the computer, having a common power supply with the computer;
   after receiving a request over a network from a hot patching service, executing the patch software using the second processor, the second processor being separate from, and having access to, the memory of the computer; and
   without stopping execution of the program using the at least first processor, updating the program and/or variables of the program using the patch software by changing the stored program and/or variables in the memory using the second processor,
   wherein the computer is a server computer used in a multi-tenant virtual environment, the program is a hypervisor running on the server computer, the multi-tenant environment comprises the hot patching service, and the second processor is part of a baseboard management controller located within the computer.

2. The method according to claim 1, wherein the second processor executes an independent operating system from that of the first processor.

3. The method according to claim 1, wherein the second processor is communicatively coupled to the computer via a peripheral bus of the computer.

4. The method according to claim 1, comprising:
   verifying, using the second processor, if a state of the memory comprises a known state; and
   if the state of the memory comprises the known state, performing the updating of the program and/or variables using the patch software.

5. The method according to claim 1, comprising:
   upon executing the program, permanently allocating a portion of the memory of the computer to the second processor.

6. The method according to claim 5, wherein the patch software is stored in, and executed from, the allocated portion of the memory.

7. The method according to claim 1, wherein the memory is a first memory and further including a second memory separate from the first memory and associated with the second processor, and wherein the second memory stores the patch software.

8. A computer-readable storage media having instructions thereon for executing a method of updating of program and/or variables, the method comprising:
   executing a program from a memory of a first computing device; and
   while executing the program from the memory of the first computing device, using a second computing device to update code and/or variables of the program stored in the memory, the updating in response to a request received by the second computing device from a hot patching service, wherein:
   the first computing device is a server computer in a multi-tenant virtual environment, the multi-tenant virtual environment comprising the hot patching service;
   the program comprises a hypervisor that is independent of an operating system running on the second computing device;
   the second computing device is peripherally connected to the first computing device using a bus so that the first computing device and the second computing device share a power supply and the operating system running on the second computing device is independent from an operating system running on the first computing device;
   the second computing device has memory access to the memory of the first computing device via the bus; and
   the second computing device is a baseboard management controller (BMC) coupled to the hot patching service via a network connection.

9. The computer-readable storage media of claim 8, wherein:
   the second computing device comprises a second processor that is an internal peripheral of the server computer and is not associated with the hypervisor.

10. The computer-readable storage media of claim 8, further including receiving, at the second computing device, patch software code and updating instructions, wherein:
    the patch software code is executed by the second computing device to access to the memory of the first computing device; and
    the updating instructions specify existing code bytes to be searched and new code bytes for replacing the existing code bytes after the existing code bytes are found.

11. The computer-readable storage media of claim 10, further including executing, by the second computing device, the received patch software code to access the memory of the first computing device for the updating.

12. The computer-readable storage media of claim 10, wherein the updating of the code and/or variables of the program stored in the memory is based on the updating instructions received by the second computing device.

13. The computer-readable storage media of claim 10, wherein:
    the patch software code is executed from memory of the BMC.

14. A system for updating code or variables, comprising:
    a first processor executing a program from a first memory of a server computer in a multi-tenant virtual environment, the first memory storing program code and/or variables of the program run by the first processor; and
    a second processor executing, in response to a request received by the second processor from a hot patching service, patch software stored in a second memory of the server computer, wherein:
    the hot patching service is part of the multi-tenant virtual environment;
    the second processor is a baseboard management controller (BMC) coupled to the server computer as an internal peripheral of the server computer so that the second processor shares a power supply with the server computer and runs an operating system that is independent from an operating system of the server computer; and
    during the executing of the patch software, the second processor is configured to update the program code and/or the variables in the first memory during execution of the program.

15. The system according to claim 14, further comprising:
a first network interface card (NIC) for accessing the first processor via a first network; and
a second NIC for accessing the second processor via a second network, wherein:
the first network is independent of the second network; and
the first and second processors are independently accessible in the multi-tenant virtual environment via the first and second NICs, respectively.

16. The system according to claim 15, wherein the second processor is independently accessible via the second NIC in the second network, using a user name and password unique for the second network.

17. The system according to claim 15, wherein the first memory is accessible independently from the first network and from the second network, each network using a separate password for accessing the first memory.

18. The system according to claim 14, wherein the second processor is operable to verify one or more states of the first memory prior to executing the patch software from the second memory.

19. The system according to claim 14, wherein the second processor is operable to monitor one or more sensors within the server computer.

\* \* \* \* \*